UNITED STATES PATENT OFFICE.

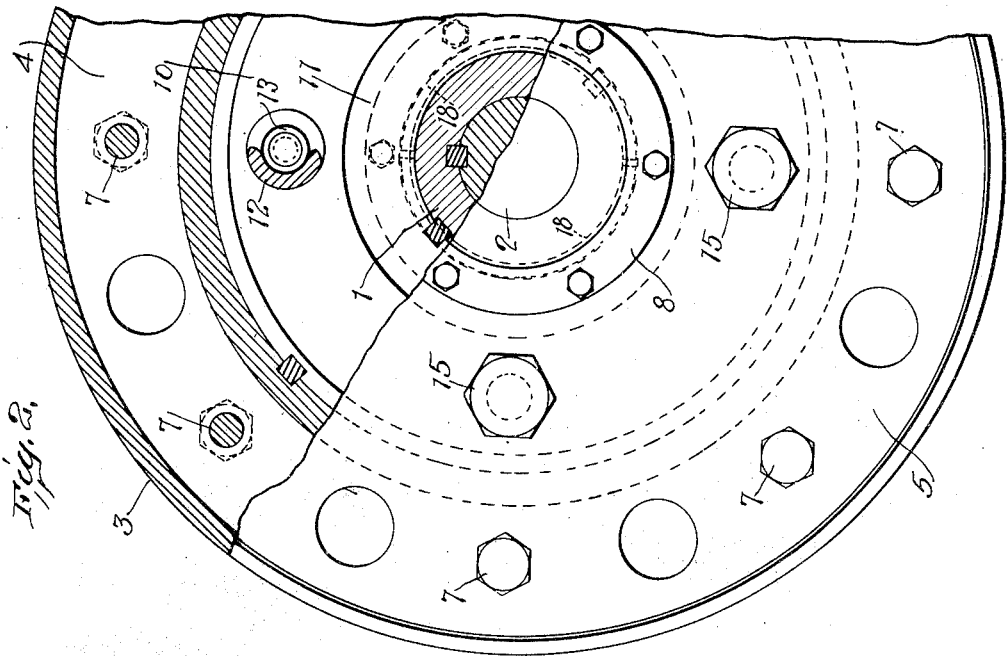
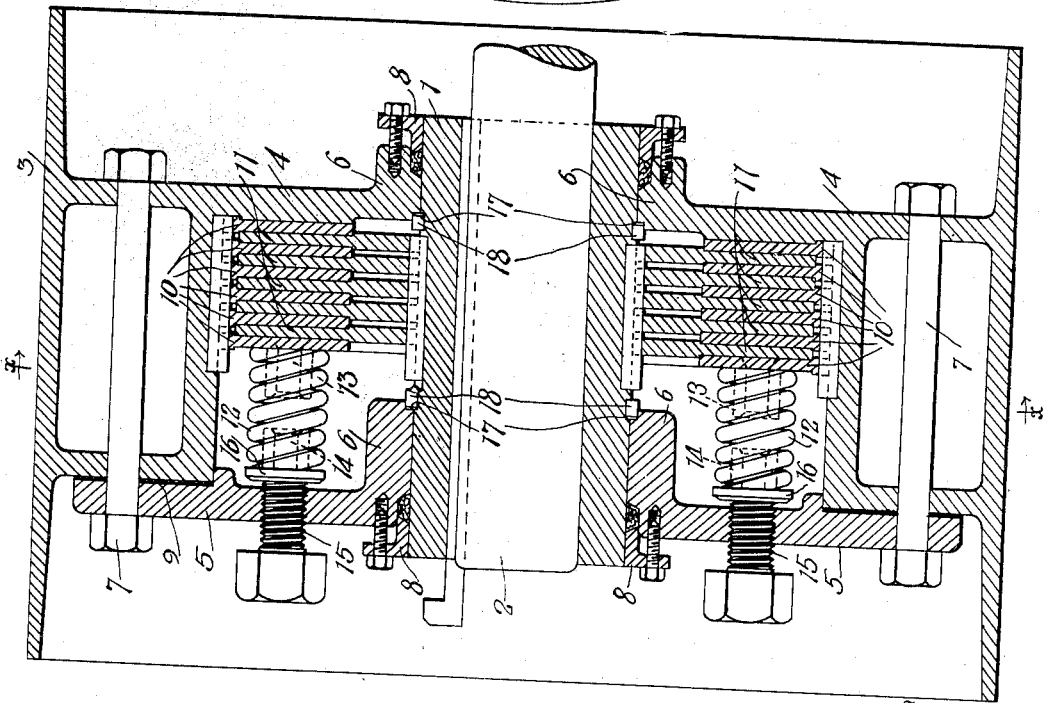

CHARLES B. KING AND JACOB W. FELLMETH, OF MARION, OHIO, ASSIGNORS TO THE MARION STEAM SHOVEL COMPANY, OF MARION, OHIO, A CORPORATION OF OHIO.

FRICTIONAL DRIVE MECHANISM.

1,043,111.  Specification of Letters Patent.  Patented Nov. 5, 1912.

Application filed September 19, 1911. Serial No. 650,241.

*To all whom it may concern:*

Be it known that we, CHARLES B. KING and JACOB W. FELLMETH, citizens of the United States, residing at Marion, in the county of Marion and State of Ohio, have invented certain new and useful Improvements in Frictional Drive Mechanism, of which the following is a specification, reference being had therein to the accompanying drawing.

This invention relates to frictional drive mechanism and is in the nature of an improvement upon the mechanism shown and described in Patent No. 833,839, granted to George W. King October 23, 1906, and assigned to The Marion Steam Shovel Company, the assignee of the present invention.

The object of the invention is to provide a mechanism of this character which will be very simple in its construction and in which a uniform friction may be maintained, and, to this end, it is a further object to provide a mechanism of this character which is self contained, i. e., in which the frictional members and the devices for maintaining the same in frictional contact one with another are mounted in an oil chamber formed between the two members of the mechanism.

It is also an object of the invention to provide means whereby the frictional contact of the friction members may be regulated from the exterior of the mechanism.

In the accompanying drawings, Figure 1 is a sectional view taken centrally through a mechanism embodying our invention; and Fig. 2 is a view of a portion of such a mechanism showing the same partly in section and partly in elevation.

In carrying out our invention we prefer to employ driving mechanism comprising two members, one of which is connected to the driving element and the other of which is connected to the element to be driven. One of these members is capable of rotary movement relatively to the other and the members are so shaped as to form between them an oil chamber. Mounted within the oil chamber is a group of friction devices which preferably consists of two series of friction rings carried by the respective members of the device. Each series of rings is so connected with its member that it will rotate therewith but is free to move axially relatively thereto and the friction rings of one series alternate with the friction rings of the other series. One of the members has a part which engages the outermost friction ring on one side of the group and limits the movement of the rings in that direction. Springs are confined between the outermost friction ring on the other side of the group and the part of the member carrying that ring. In this manner the whole of the frictional devices are supported within the oil chamber and there are no exterior frictional parts.

In the accompanying drawings we have shown the invention as applied to a belt pulley comprising a hub portion 1 keyed to a shaft 2 and constituting one member of the frictional driving mechanism. The body portion of the pulley constitutes the other member of the frictional drive mechanism and comprises a rim 3 having inwardly extending webs 4 and 5 provided at their inner ends with bearing portions 6 which engage the hub 1 and rotatably support the rim thereon. To facilitate the manufacture and assembling of the mechanism, as will hereinafter appear, the inwardly extending web 5 is formed separate from the remainder of the body portion of the pulley and is connected thereto by means of bolts 7. The two webs 4 and 5 are spaced apart and form between them a chamber within which may be confined a quantity of lubricant. To prevent the escape of this lubricant from the chamber the bearing portions 6 of the outer member of the mechanism are provided with packing glands 8 and a gasket 9 is interposed between the detachable web 5 and that portion of the outer member to which it is connected. A group of friction devices are mounted within the chamber and connected with the respective members. This group of friction devices preferably comprises a series of friction rings 10 splined to the outer member 3 of the mechanism and a second series of friction rings 11 splined to the inner member or hub 1. The friction rings of the two series are arranged alternately and their connection with the respective members is such that they may move axially relatively thereto but are caused to rotate therewith.

The web 4 of the outer member 3 constitutes an abutment which engages the outermost friction ring on the adjacent side of the group of rings and limits the movement of the several rings toward said web. Suitable means are interposed between the outermost friction ring on the opposite side of the group of rings and a part carried by that member with which said ring is connected to maintain the desired frictional contact between the several friction rings. This means preferably comprises a series of springs 12 which are coiled about studs 13 secured to the outermost friction ring, which, in the present instance, is carried by the outer member 3, and other studs 14 carried by the web 5 which forms a part of said outer member. The studs 14 are preferably provided with screw-threaded portions 15 which are mounted in the web 5 and enable the studs 14 to be adjusted to regulate the tension of the springs. Each stud 14 is preferably provided with a washer 16 which is rigidly secured thereto and forms an abutment against which the end of the spring bears. The bearing portions 6 of the outer member 3 may be held against longitudinal movement relatively to the hub 1 in any suitable manner. In the present instance these portions of the outer member are provided with annular recesses 17 adjacent to the hub and rings 18 are mounted in these recesses and in corresponding recesses formed in the hub member 1. Each ring is preferably formed in two parts and is mounted in the recess in the hub member when the mechanism as a whole is being assembled and the bearing portion of the outer member is moved over the outer surface of the ring, thereby causing the ring to enter the annular recess in said bearing portion. This arrangement retains the two parts of the ring in the recess in the hub member and the ring itself holds the respective bearing portion of the outer member against movement in one direction on the hub. The two rings 18 being both arranged on the inner sides of their respective bearing portions it will be apparent that the outer member as a whole is held against axial movement relatively to the hub member in either direction.

The operation of the mechanism will be readily understood from the foregoing description and it will be apparent that the frictional contact between the several friction-rings is uniform and can be regulated to accommodate the same to varying conditions. It will further be apparent that the mechanism is self contained and that there are no external friction devices. It will also be apparent that the construction is a very simple one comprising a minimum number of parts and that these parts are of such a character and so arranged that they are not liable to become disarranged or broken; and further, that the construction of the device is such that access can be readily had to the frictional devices should this be desirable.

While we have shown the invention as applied to a belt pulley it will be understood that this is chosen for the purpose of illustration only and that we do not wish to be limited to the details of construction shown and described, for obvious modifications will occur to a person skilled in the art.

Having thus fully described our invention, what we claim as new and desire to secure by Letters Patent, is:—

1. A frictional drive mechanism comprising two members, one of said members having bearing surfaces and the other of said members having bearings to engage said bearing surfaces, said members being arranged to form between them an oil chamber, a series of friction rings carried by each of said members, the rings of one series alternating with the rings of the other series, and the rings of both series rotating with and being movable axially relatively to the respective members, and means confined within said casing to exert pressure on the outer ring on one side of the group of rings and one of said members having a part arranged to limit the movement of the outermost ring on the other side of said group of rings.

2. A frictional drive mechanism comprising two members, one of said members having bearing surfaces and the other of said members having annular webs provided with bearings to engage said bearing surfaces, said webs being spaced apart and coöperating with the first-mentioned member to form an oil chamber extending about said first-mentioned member, a series of friction rings carried by each of said members, the rings of one series alternating with the rings of the other series and the rings of both series being rotatable with and movable axially relatively to the respective members, and a spring confined between the outer ring on one side of the group of rings and the member carrying said ring, one of said members having a part arranged to limit the movement of the outermost ring on the other side of said group of rings.

3. A frictional drive mechanism comprising two members, one of said members having bearing surfaces and the other of said members having bearings to engage said bearing surfaces, said members being arranged to form between them an oil chamber, a series of friction rings carried by each of said members, the rings of one series alternating with the rings of the other series, and the rings of both series rotating with and being movable axially relatively to the respective members, a series of springs confined between the outer ring on one side of the group of rings and the member carrying said ring, one of said members having a part arranged to limit the movement of the outermost ring on the other side of said group of rings, and separate means operable from the exterior of said chamber to adjust the tension of the respective springs.

4. A frictional drive mechanism comprising two members, one of said members being mounted upon and rotatable relatively to the other of said members and having an annular chamber adjacent to said other member, a series of friction rings carried by each of said members, rotatable therewith and movable axially relatively thereto, one of said members having means to limit the movement of the outermost ring on one side of the group of rings, a screw-threaded stud mounted in one wall of said chamber and extending into the same, a stop carried by said stud, and a spring confined between said stop and the adjacent friction ring.

5. A frictional drive mechanism comprising two members, one of said members having bearing surfaces and the other of said members having bearings to engage said bearing surfaces, said members being arranged to form between them an oil chamber, means to hold said members against relative axial movement, a series of friction rings carried by each of said members and extending into said oil chamber, the rings of one series alternating with the rings of the other series and the rings of both series rotating with and being movable axially relatively to the respective members, and means arranged within said chamber for exerting pressure on the outer ring on one side of said group of rings, one of said members having a part arranged to limit the movement of the outermost ring on the other side of said group of rings.

6. A frictional drive mechanism comprising a hub member having annular grooves therein, an outer member having inwardly extending portions mounted upon and rotatable relatively to said hub portion and having annular recesses adjacent to the respective grooves in said hub portion, two part rings mounted in the respective grooves in said hub portion and extending into said annular recesses, a series of friction rings carried by each of said members, the rings of one series alternating with the rings of the other series and the rings of both series being rotatable with and movable axially relatively to their respective members, and springs confined between the outermost ring on one side of the group of rings and a part carried by the member with which said ring is connected.

In testimony whereof, we affix our signatures in presence of two witnesses.

CHARLES B. KING.
JACOB W. FELLMETH.

Witnesses:
H. H. CONNELLY,
C. W. WRIGHT.